Feb. 3, 1925.
D. C. DAVIS
TANK CAP
Filed April 20, 1923
1,525,273
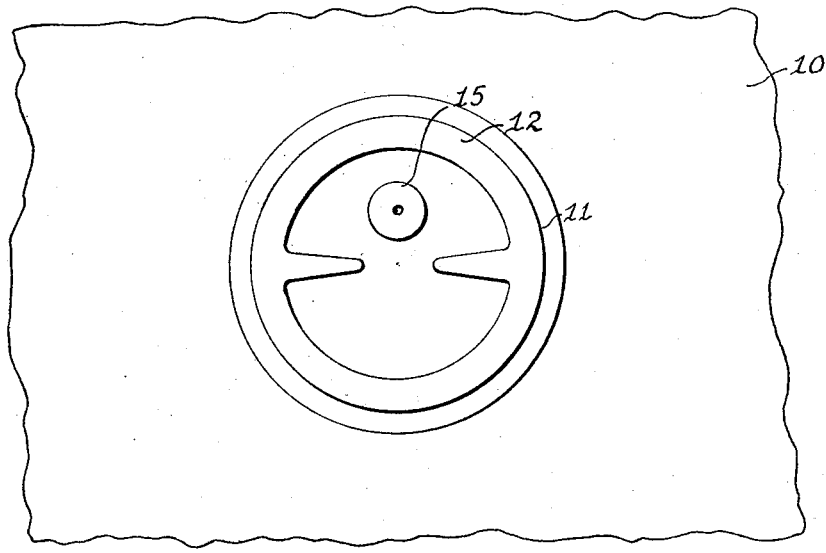
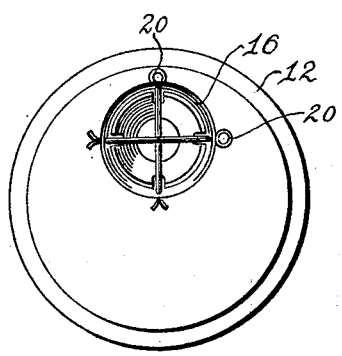
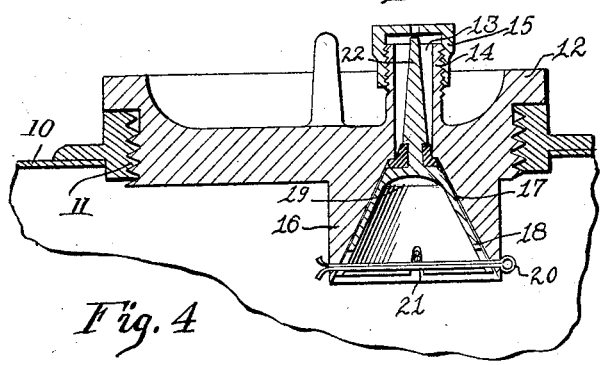
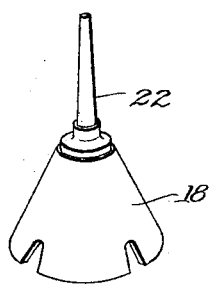
Daniel C. Davis
INVENTOR
BY Victor J. Evans
ATTORNEY Patented Feb. 3, 1925.

1,525,273

UNITED STATES PATENT OFFICE.

DANIEL C. DAVIS, OF VILONIA, ARKANSAS.

TANK CAP.

Application filed April 20, 1923. Serial No. 633,492.

*To all whom it may concern:*

Be it known that I, DANIEL C. DAVIS, a citizen of the United States, residing at Vilonia, in the county of Faulkner and State of Arkansas, have invented new and useful Improvements in Tank Caps, of which the following is a specification.

This invention relates to improvements in fuel supply systems for automobiles and has for an object the provision of means whereby air under pressure may be forced into the fuel tank for the purpose of insuring a proper supply of fuel for the engine, the invention being especially useful in gravity feed systems when the supply of fuel falls below the level of the engine carburetor, due to an insufficient amount of fuel or when ascending a grade.

Another object of the invention is the provision of means of the above character which may be carried by the cap of the filling opening, so that the invention may be manufactured as a single unit and substituted for caps now commonly used.

With the above and other objects in view, the invention further includes the following novel features and details of construction, to be hereinafter more fully described, illustrated in the accompanying drawings and pointed out in the appended claim.

In the drawings:—

Figure 1 is a plan view of a fragmentary portion of the fuel tank of an automobile showing the invention applied.

Figure 2 is a bottom plan view of the cap removed from the tank.

Figure 3 is an enlarged sectional view.

Figure 4 is a detail perspective view of the valve member.

Referring in detail to the drawings, wherein like characters of reference denote corresponding parts, the reference character 10 indicates a portion of the fuel supply tank of an automobile provided with the usual filling opening 11. This opening is adapted to be closed by a removable cap 12, which, in the present instance is provided with an inlet port 13. The purpose of this port is to permit of the introduction of air under pressure so that fuel within the tank may be forced to the carburetor of the engine irrespective of the relative positions of the carburetor and tank.

To facilitate the introduction of air into the tank and to prevent its escape through the opening 11, the said opening is surrounded upon the outside of the cap 12 with a threaded nipple 14 which is normally covered by a cap 15 having an opening therein. The nipple 14 is of a proper size for attachment to the end of an air hose, such as the hose of a tire pump and this hose may be conveniently attached and sufficient air provided to force the fuel to the carbureter. In addition the air pressure may be utilized to blow and clean out the fuel line so as to keep the same in proper condition for the supply of fuel.

The inner end of the port 13 is surrounded by a flange 16 of an appreciable depth and the inner wall of this flange is inclined so as to provide a tapered seat 17 having a valve member 18. This valve member has its outer surface shaped to conform to the tapered seat 17 and is preferably hollow to reduce weight and to provide a pocket 19 to receive the pressure of air and force the valve upward in engagement with its seat. Downward or opening movement of the valve 18 is limited by crossed pins 20 and the valve member 18 is provided with notches 21 which receive these pins. The valve member 18 has preferably extending therefrom a stem 22 which extends upward through the inlet port 13 to provide convenient means whereby the valve may be manually unseated in the event of its sticking.

When there is no air pressure in the fuel tank, the valve member 18 will drop by gravity to its lower position so that the inlet port 13 will be open, allowing air to pass into the tank and permitting fuel to flow to the carbureter in the usual manner.

While the invention is shown and described as applied to the fuel supply tank of an automobile, it is capable of other uses and it is not the purpose of the present application to confine the use of the invention to the particular purpose herein set forth.

The invention is susceptible of various changes in its form, proportions and minor details of construction and the right is herein reserved to make such changes as properly fall within the scope of the appended claim.

Having described the invention what is claimed is:—

A tank cap of the character described embodying a port, a flange surrounding said port and having a tapered seat, the lower end of the flange being apertured and in registration with the port, a substantially hollow tapered valve member positioned within the flange, a tapered stem projecting from the reduced portion of the valve and extending into the port, a plurality of notches provided at diametrically opposite sides upon the periphery of the valve, and cotter pins extending through the flange and slots in the valve member to support the latter within the former.

In testimony whereof I affix my signature.

DANIEL C. DAVIS.